United States Patent
Leming et al.

(10) Patent No.: US 12,266,835 B2
(45) Date of Patent: Apr. 1, 2025

(54) SOFC INCLUDING REDOX-TOLERANT ANODE ELECTRODE AND METHOD OF MAKING THE SAME

(71) Applicant: BLOOM ENERGY CORPORATION, San Jose, CA (US)

(72) Inventors: Andres Leming, Sunnyvale, CA (US); Emad El Batawi, Mountain View, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 1210 days.

(21) Appl. No.: 16/508,108

(22) Filed: Jul. 10, 2019

(65) Prior Publication Data

US 2019/0334190 A1   Oct. 31, 2019

Related U.S. Application Data

(63) Continuation-in-part of application No. 15/915,281, filed on Mar. 8, 2018, now Pat. No. 10,680,251.

(60) Provisional application No. 62/697,015, filed on Jul. 12, 2018, provisional application No. 62/550,845, filed on Aug. 28, 2017.

(51) Int. Cl.
| | |
|---|---|
| H01M 8/1246 | (2016.01) |
| H01M 4/88 | (2006.01) |
| H01M 4/90 | (2006.01) |
| H01M 8/0202 | (2016.01) |
| H01M 8/12 | (2016.01) |

(52) U.S. Cl.
CPC ....... *H01M 8/1246* (2013.01); *H01M 4/8842* (2013.01); *H01M 4/8885* (2013.01); *H01M 4/9066* (2013.01); *H01M 8/0202* (2013.01); H01M 2008/1293 (2013.01)

(58) Field of Classification Search
CPC .......................... H01M 4/9033; H01M 4/9066
See application file for complete search history.

(56) References Cited

U.S. PATENT DOCUMENTS

| | | | |
|---|---|---|---|
| 4,052,532 | A | 10/1977 | Tannenberger |
| 4,272,353 | A | 6/1981 | Lawrance et al. |
| (Continued) | | | |

FOREIGN PATENT DOCUMENTS

| | | |
|---|---|---|
| CN | 101147285 A | 3/2008 |
| CN | 101295792 A | 10/2008 |
| (Continued) | | |

OTHER PUBLICATIONS

Wataru et al. (Ni—Fe/Sm-doped CeO2 anode for ammonia-fueled solid oxide fuel cells), Jan. 2014, Solid state Ionics, 256, Elsevier http://dx.doi.org/10.1016/j.ssi.2013.12.026 (Year: 2014).*

(Continued)

*Primary Examiner* — Maria Laios
(74) *Attorney, Agent, or Firm* — THE MARBURY LAW GROUP PLLC

(57) ABSTRACT

A solid oxide fuel cell (SOFC) includes a solid oxide electrolyte, an anode disposed on a first side of the electrolyte and a cathode disposed on an opposing second side of the electrolyte. The anode includes a ceramic phase and a metallic phase including a Ni catalyst and a dopant including Al, Ba, Ca, Cr, Fe, Mo, Re, Rh, Ru, Sr, W, or any combination thereof.

18 Claims, 2 Drawing Sheets

(56) References Cited

U.S. PATENT DOCUMENTS

| | | |
|---|---|---|
| 4,426,269 A | 1/1984 | Brown et al. |
| 4,459,340 A | 7/1984 | Mason |
| 4,575,407 A | 3/1986 | Diller |
| 4,686,158 A | 8/1987 | Nishi et al. |
| 4,792,502 A | 12/1988 | Trocciola et al. |
| 4,804,592 A | 2/1989 | Vanderborgh et al. |
| 4,847,173 A | 7/1989 | Mitsunnaga et al. |
| 4,898,792 A | 2/1990 | Singh et al. |
| 4,913,982 A | 4/1990 | Kotchick et al. |
| 4,917,971 A | 4/1990 | Farooque |
| 4,925,745 A | 5/1990 | Remick et al. |
| 4,983,471 A | 1/1991 | Reichner et al. |
| 5,034,287 A | 7/1991 | Kunz |
| 5,047,299 A | 9/1991 | Shockling |
| 5,143,800 A | 9/1992 | George et al. |
| 5,162,167 A | 11/1992 | Minh et al. |
| 5,169,730 A | 12/1992 | Reichner et al. |
| 5,170,124 A | 12/1992 | Blair et al. |
| 5,171,645 A | 12/1992 | Khandkar |
| 5,192,334 A | 3/1993 | Rohr et al. |
| 5,213,910 A | 5/1993 | Yamada |
| 5,215,946 A | 6/1993 | Minh |
| 5,256,499 A | 10/1993 | Minh et al. |
| 5,273,837 A | 12/1993 | Aiken et al. |
| 5,290,323 A | 3/1994 | Ryoichi |
| 5,290,642 A | 3/1994 | Minh et al. |
| 5,302,470 A | 4/1994 | Okada et al. |
| 5,342,705 A | 8/1994 | Minh et al. |
| 5,368,667 A | 11/1994 | Minh et al. |
| 5,441,821 A | 8/1995 | Merritt et al. |
| 5,498,487 A | 3/1996 | Ruka et al. |
| 5,501,914 A | 3/1996 | Satake et al. |
| 5,505,824 A | 4/1996 | McElroy |
| 5,518,829 A | 5/1996 | Satake et al. |
| 5,527,631 A | 6/1996 | Singh et al. |
| 5,573,867 A | 11/1996 | Zafred et al. |
| 5,589,017 A | 12/1996 | Minh |
| 5,589,285 A | 12/1996 | Cable et al. |
| 5,601,937 A | 2/1997 | Isenberg |
| 5,686,196 A | 11/1997 | Singh et al. |
| 5,688,609 A | 11/1997 | Rostrup-Nielsen et al. |
| 5,733,675 A | 3/1998 | Dederer et al. |
| 5,741,406 A | 4/1998 | Barnett |
| 5,741,605 A | 4/1998 | Gillett et al. |
| 5,922,488 A | 7/1999 | Marucchi-Soos et al. |
| 5,955,039 A | 9/1999 | Dowdy |
| 5,993,989 A | 11/1999 | Baozhen |
| 6,013,385 A | 1/2000 | DuBose |
| 6,051,125 A | 4/2000 | Pham et al. |
| 6,106,964 A | 8/2000 | Voss et al. |
| 6,228,521 B1 | 5/2001 | Kim et al. |
| 6,238,816 B1 | 5/2001 | Cable et al. |
| 6,280,865 B1 | 8/2001 | Eisman et al. |
| 6,287,716 B1 | 9/2001 | Hashimoto et al. |
| 6,329,090 B1 | 12/2001 | McElroy et al. |
| 6,361,892 B1 | 3/2002 | Ruhl et al. |
| 6,403,245 B1 | 6/2002 | Hunt |
| 6,436,562 B1 | 8/2002 | DuBose et al. |
| 6,451,466 B1 | 9/2002 | Grasso et al. |
| 6,489,050 B1 | 12/2002 | Ruhl et al. |
| 6,495,279 B1 | 12/2002 | Bogicevic et al. |
| 6,558,831 B1 | 5/2003 | Doshi et al. |
| 6,582,845 B2 | 6/2003 | Helfinstine et al. |
| 6,592,965 B1 | 7/2003 | Gordon |
| 6,605,316 B1 | 8/2003 | Visco |
| 6,623,880 B1 | 9/2003 | Geisbrecht et al. |
| 6,677,070 B2 | 1/2004 | Kearl |
| 6,682,842 B1 | 1/2004 | Visco et al. |
| 6,767,662 B2 | 7/2004 | Jacobson |
| 6,787,261 B2 | 9/2004 | Ukai |
| 6,803,141 B2 | 10/2004 | Pham |
| 6,811,913 B2 | 11/2004 | Ruhl |
| 6,821,663 B2 | 11/2004 | McElroy et al. |
| 6,854,688 B2 | 2/2005 | McElroy et al. |
| 6,924,053 B2 | 8/2005 | McElroy |
| 6,972,161 B2 | 12/2005 | Beatty et al. |
| 6,979,511 B2 | 12/2005 | Visco |
| 7,150,927 B2 | 12/2006 | Hickey et al. |
| 7,157,173 B2 | 1/2007 | Kwon |
| 7,255,956 B2 | 8/2007 | McElroy |
| 7,494,732 B2 | 2/2009 | Roy |
| 7,550,217 B2 | 6/2009 | Kwon |
| 7,563,503 B2 | 7/2009 | Gell |
| 7,601,183 B2 | 10/2009 | Larsen |
| 8,617,763 B2 | 12/2013 | Armstrong et al. |
| 8,748,056 B2 | 6/2014 | Batawi et al. |
| 9,306,221 B2 * | 4/2016 | Fukasawa ............ H01M 4/9025 |
| 2001/0049035 A1 | 12/2001 | Haltiner, Jr. et al. |
| 2002/0012825 A1 | 1/2002 | Sasahara et al. |
| 2002/0014417 A1 | 2/2002 | Kuehnle et al. |
| 2002/0028362 A1 | 3/2002 | Prediger et al. |
| 2002/0028367 A1 | 3/2002 | Sammes et al. |
| 2002/0058175 A1 | 5/2002 | Ruhl |
| 2002/0098406 A1 | 7/2002 | Huang et al. |
| 2002/0106544 A1 | 8/2002 | Noetzel et al. |
| 2002/0127455 A1 | 9/2002 | Pham et al. |
| 2002/0132156 A1 | 9/2002 | Ruhl et al. |
| 2003/0035989 A1 | 2/2003 | Gorte et al. |
| 2003/0162067 A1 | 8/2003 | McElroy |
| 2003/0165732 A1 | 9/2003 | McElroy |
| 2003/0196893 A1 | 10/2003 | McElroy |
| 2004/0081859 A1 | 4/2004 | McElroy et al. |
| 2004/0191595 A1 | 9/2004 | McElroy et al. |
| 2004/0191597 A1 | 9/2004 | McElroy |
| 2004/0191598 A1 | 9/2004 | Gottmann et al. |
| 2004/0202914 A1 | 10/2004 | Sridhar et al. |
| 2004/0224193 A1 | 11/2004 | Mitlitsky et al. |
| 2005/0048334 A1 | 3/2005 | Sridhar et al. |
| 2005/0074650 A1 | 4/2005 | Sridhar et al. |
| 2005/0164051 A1 | 7/2005 | Venkataraman et al. |
| 2005/0227134 A1 | 10/2005 | Nguyen |
| 2005/0271919 A1 | 12/2005 | Hata et al. |
| 2006/0008682 A1 | 1/2006 | McLean et al. |
| 2006/0040168 A1 | 2/2006 | Sridhar |
| 2006/0127747 A1 * | 6/2006 | Arico ...................... C04B 35/01 |
| | | 429/513 |
| 2006/0166070 A1 | 7/2006 | Hickey et al. |
| 2006/0216575 A1 | 9/2006 | Cassidy |
| 2006/0222929 A1 | 10/2006 | Hickey et al. |
| 2007/0045125 A1 | 3/2007 | Hartvigsen et al. |
| 2007/0082254 A1 | 4/2007 | Hiwatashi |
| 2007/0141423 A1 | 6/2007 | Suzuki |
| 2007/0141443 A1 | 6/2007 | Brown |
| 2007/0141444 A1 | 6/2007 | Brown |
| 2007/0224481 A1 | 9/2007 | Suzuki et al. |
| 2007/0237999 A1 | 10/2007 | Donahue |
| 2007/0275292 A1 | 11/2007 | Sin Xicola et al. |
| 2007/0287048 A1 * | 12/2007 | Couse ............... H01M 8/04082 |
| | | 429/444 |
| 2008/0029388 A1 | 2/2008 | Elangovan |
| 2008/0075984 A1 | 3/2008 | Badding |
| 2008/0076006 A1 | 3/2008 | Gottmann et al. |
| 2008/0096080 A1 * | 4/2008 | Batawi ................ H01M 4/8885 |
| | | 429/513 |
| 2008/0102337 A1 | 5/2008 | Hiroyuki |
| 2008/0166618 A1 | 7/2008 | Larsen et al. |
| 2008/0254336 A1 | 10/2008 | Batawi |
| 2008/0261099 A1 | 10/2008 | Nguyen |
| 2009/0029195 A1 | 1/2009 | Gauckler |
| 2009/0068533 A1 | 3/2009 | Takayuki |
| 2009/0148742 A1 | 6/2009 | Day et al. |
| 2009/0186250 A1 | 7/2009 | Yeshwanth |
| 2009/0214919 A1 | 8/2009 | Suzuki |
| 2009/0291347 A1 | 11/2009 | Suzuki |
| 2011/0039183 A1 | 2/2011 | Armstrong et al. |
| 2011/0183233 A1 | 7/2011 | Armstrong et al. |
| 2019/0067705 A1 | 2/2019 | Gasda et al. |

FOREIGN PATENT DOCUMENTS

| | | |
|---|---|---|
| GB | 1048839 A | 11/1966 |
| JP | 3196465 A | 8/1991 |
| JP | 6215778 | 8/1994 |
| JP | 2000-281438 | 10/2000 |

(56) References Cited

FOREIGN PATENT DOCUMENTS

| | | | |
|---|---|---|---|
| JP | 2004-507061 | 3/2004 | |
| JP | 2004-531857 | 10/2004 | |
| JP | 2008-239353 | 10/2008 | |
| JP | 2008-541336 | 11/2008 | |
| JP | 2009-110933 | 5/2009 | |
| JP | 2013-31981 | * 2/2013 | ............ Y02E 60/50 |
| JP | 2015-509277 | 3/2015 | |
| KR | 20020092223 A | 12/2002 | |
| KR | 20070095440 A | 9/2007 | |
| KR | 20080010737 A | 1/2008 | |
| KR | 20080097971 | 11/2008 | |
| KR | 100886239 B1 | 2/2009 | |
| KR | 20090061870 A | 6/2009 | |
| WO | WO2004/093214 | 10/2004 | |
| WO | WO2005/041329 | 5/2005 | |
| WO | WO2006/079558 A1 | 8/2006 | |
| WO | WO2008/019926 | 2/2008 | |
| WO | WO2009/097110 | 8/2009 | |

OTHER PUBLICATIONS

Machince translation of JP 2013-31981 (Year: 2022).*
Ahmad-Khantou et al., "Electrochemical & Microstructural Study of SOFC Cathodes Based on $La_{0.5}Sr_{0.3MnO3}$ and $Pr_{0.65}Sr_{0.3}MnO_3$," Electrochemical Society Proceedings, 2001, p. 476-485, vol. 2001-16.
Mori et al., "Lanthanum Alkaline-Earth Manganites as a Cathode Material in High-Temperature Solid Oxide Fuel Cells," Journal of the Electrochemical Society, 1999, p. 4041-4047, vol. 146.
L.G. Austin, "Cell & Stack Construction: Low Temperature Cells," NASA SP-120, 1967.
EG & G Services, Parsons, Inc., SAIC, Fuel Cell Handbook, 5th Edition, USDOE, Oct. 2000, p. 9-1-9.4, and 9-12-9-14.
J.M. Sedlak, et al., "Hydrogen Recovery and Purification Using the Solid Polymer Electrolyte Electrolysis Cell," Int. J. Hydrogen Energy, vol. 6, p. 45-51, 1981.
Dr. Ruhl, "Low Cost Reversible Fuel Cell System," Proceedings of the 2000 U.S. DOE Hydrogen Program Review, Jun. 15, 2000, NREL/CP-570-30535.
Low Cost, Compact Solid Oxide Fuel Cell Generator, NASA Small Business Innovation Research Program.
Low Cost, High Efficiency Reversible Fuel Cell (and Electrolyzer) Systems, Proceedings of the 2001 DOE Hydrogen Program Review NREL/CP-570-30535.
Milliken et al., "Low Cost, High Efficiency Reversible Fuel Cell Systems," Proceedings of the 2002 U.S. Doe Hydrogen Program Review, NREL/CP-610-32405.
K. Eguchi et al., Power Generation and Steam Electrolysis Characteristics of an Electrochemical Cell with a Zirconia or Ceria based Electrode, Solid State Ionics, 86 88, 1996, p. 1245-49.
F. Mitlitsky et al., "Regenerative Fuel Cells for High Altitude Long Endurance Solar Powered Aircraft," $28^{th}$ Intersociety Energy Conversion Engineering Conference (IECED), Jul. 28, 1993, UCRL-JC-113485.
Small, Ultra Efficient Fuel Cell Systems, Advanced Technology Program, ATP 2001 Competition, Jun. 2002.
F. Mitlitsky et al., Unitized Regenerative Fuel Cells for Solar Rechargeable Aircraft and Zero Emission Vehicles, 1994 Fuel Cell Seminar, Sep. 6, 1994, UCRL-JC-117130.
Ralph et al., "Cathode Materials for Reduced-Temperature SOFCs," Journal of the Electrochemical Society, 2003, p. A1518-A1522, vol. 150.
Simmer et al., "Development of Fabrication Techniques and Electrodes for Solid Oxide Fuel Cells," Electrochemcial Society Proceedings, p. 1050-1061, vol. 2001-16.
Yamamoto et al., "Electrical Conductivity of Stabilized Zirconia with Ytterbia and Scandia," Solid State Ionics, v79, p. 137-142, Jul. 1995.
Araki et al., "Degradation Mechanism of Scandia-Stabilized Zirconia Electrolytes: Discussion based on Annealing Effects on Mechanical Strength, Ionic Conductivity, and Raman Spectrum," Solid State Ionics, v180, n28-31, p. 1484-1489, Nov. 2009.
Lybye et al., "Effect of Transition Metal Ions on the Conductivity and Stability of Stabilized Zirconia," Ceramic Engineering and Science Proceedings, v27, n4, p. 67-78, 2006.
International Search Report and Witten Opinion from the International Searching Authority for International Patent Application No. PCT/US2010/045182, dated Apr. 27, 2011, 10 pages.
Tikekar, N. M. et al., "Reduction and Reoxidation Kinetics of Nickel-Based SOFC Anodes," Journal of the Electrochemical Society, vol. 153, No. 4, pp. A654-A663, (2006).
Korean Application No. 10-2018-0037428, Notification of Preliminary Rejection, issued Jun. 20, 2019, 6pgs.

* cited by examiner

SOFC INCLUDING REDOX-TOLERANT ANODE ELECTRODE AND METHOD OF MAKING THE SAME

FIELD

The present invention is generally directed to a solid oxide fuel cell (SOFC) including a redox-tolerant anode and SOFC systems including the same.

BACKGROUND

In a high temperature fuel cell system, such as a SOFC system, an oxidizing flow is passed through the cathode side of the fuel cell, while a fuel flow is passed through the anode side of the fuel cell. The oxidizing flow is typically air, while the fuel flow can be a hydrocarbon fuel, such as methane, natural gas, propane, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide.

The excess electrons from the negatively charged ion are routed back to the cathode side of the fuel cell through an electrical circuit completed between anode and cathode, resulting in an electrical current flow through the circuit.

Solid oxide fuel cells operate using hydrocarbon based fuel. SOFC's operate in one of two modes; a pre-reforming mode or an internally reforming mode. In the pre-reforming mode, the hydrocarbon fuel is pre-reformed into a syn-gas ($CO+H_2$) before entering the fuel cell. The anode provides an electro-catalytically active surface for oxidation of the pre-reformed fuel and ensures sufficient oxide-ionic and electronic conduction. In the internally reforming mode, the hydrocarbon fuel enters the SOFC where it is exposed to the anode. As in the pre-reforming mode, the anode provides both fuel oxidation and ionic and electronic transport. However, the anode must also internally reform the hydrocarbon fuel.

SUMMARY

According to various embodiments, provided is a solid oxide fuel cell (SOFC) comprising: a solid oxide electrolyte; an anode disposed on a first side of the electrolyte and comprising: a ceramic phase; and a metallic phase comprising Ni and a dopant comprising Al, Ba, Ca, Cr, Fe, Mo, Re, Rh, Ru, Sr, W, or any combination thereof; and a cathode disposed on an opposing second side of the electrolyte.

According to various embodiments of the present disclosure, provided is a method of forming an anode of a solid oxide fuel cell (SOFC), the method comprising: coating a first side of an electrolyte with an anode ink; drying the coated electrolyte; and sintering the dried electrolyte to form an anode. The anode comprises a ceramic phase and a metallic phase comprising Ni and a dopant comprising Al, Ba, Ca, Cr, Fe, Mo, Re, Rh, Ru, Sr, W, or any combination thereof.

DETAILED DESCRIPTION

Figure 1:
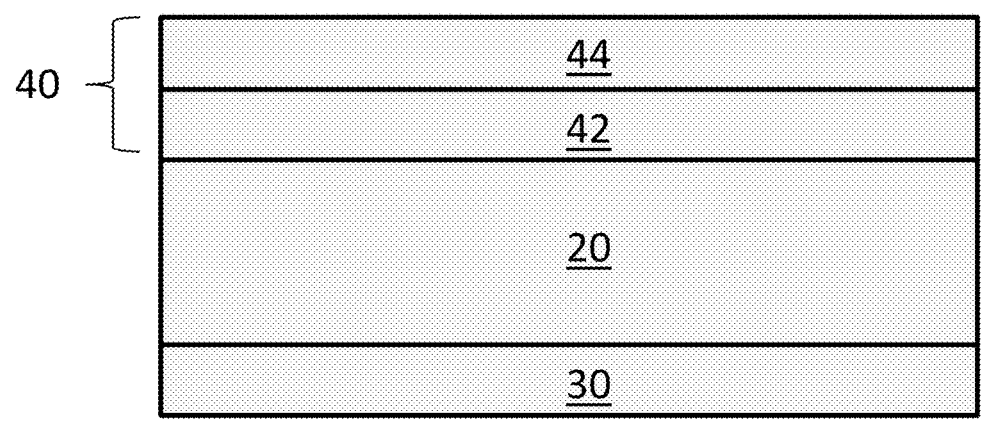
FIG. 1 is a cross-sectional view of a fuel cell according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. In some embodiments, a value of "about X" may include values of +/−1% X. It will be further understood that the endpoints of each of the ranges are significant both in relation to the other endpoint, and independently of the other endpoint.

Anode electrodes operating under conditions of extreme fuel starvation are usually irreversibly damaged. Such starvation conditions are usually encountered in stacks where isolated repeat elements (i.e., specific fuel cells) obtain less fuel than their neighboring elements (i.e., the neighboring fuel cells). These elements witness effective fuel utilization in excess of 100%. Similar conditions may arise during system transitions or operating anomalies where the fuel supply to the cell does not correspond to the current drawn. Under these circumstances, the oxygen ion flux to the anode will oxidize the anode constituents. Nickel present at the three phase boundary of traditional anodes will instantaneously oxidize. The phase change from Ni metal to NiO is accompanied by a change in volume that causes mechanical damage at the anode/electrolyte interface. This mechanical damage is characterized by delamination of the electrode from the electrolyte which increases the specific resistance of the cell and dramatically decreases the stack performance. To avoid oxidation of the nickel and mechanical damage of the electrode electrolyte interface, which leads to delamination, one prior art solution was to employ an all ceramic anode. While the ceramic anodes show better stability in starvation conditions, they are associated with high polarization losses.

Thus, state-of-the-art anodes are composites. These anodes are composed of an electro-catalytic material that is primarily an electronic conductor, such as Ni metal, and an oxide-ionic conductive material. Traditionally, state of the art anodes are Ni-ceria or Ni-zirconia cermets. These cermet anodes operating under internal reforming mode are susceptible to failure by anode delamination, structural failure at the leading edge where the hydrocarbon fuel enters the cell, or nickel dusting from internal Ni-carbide formation resulting in embrittlement.

According to various embodiments, provided is a fuel cell, such as a solid oxide fuel cell (SOFC) that includes an anode that allows for the direct internal reforming of hydrocarbon fuels on the anode and reliable operation under fuel starvation conditions. The anode eliminates the need for a pre-reformer or an external reformer, thus significantly reducing costs. The fuel cell comprises a cathode electrode, a solid oxide electrolyte, and the anode electrode, and may be included in a fuel cell system. The anode electrode may comprise a cermet comprising a metallic phase, which may include nickel, and a ceramic phase. The anode may comprise a first layer and a second layer arranged such that the first layer is disposed between the electrolyte and the second layer. The first layer may have a lower porosity and/or metal content than the second layer.

In operation, a fuel stream is provided to the anode and an oxidant such as air is provided to the cathode. The fuel stream may include a mixture of hydrogen ($H_2$), carbon monoxide (CO), carbon dioxide ($CO_2$), steam ($H_2O$), methane ($CH_4$), and other trace hydrocarbon gases. Since fuel stream may be substantially oxygen-free, the anode environment is chemically reducing. As such, nickel oxide in the anode may be reduced to nickel metal, such that the nickel operates as a catalyst during operation of the fuel cell.

However, sometimes the fuel stream is interrupted, such as for example when the fuel cell or system thereof must be shut down for service. In such system operating interruptions, the fuel stream is stopped, and oxygen can leak in through aged seals, or diffuse upstream through an exhaust port. When the anode is exposed to oxygen, especially at a high temperature (e.g., temperatures above about 300° C.), the metal catalyst (e.g., nickel) included in the anode may be chemically oxidized.

Without wishing to be bound by theory, it is thought that with each redox cycle, nickel particles agglomerate into larger and larger particles, such that the agglomerated nickel particles are formed. This can lead to microstructure coarsening, nickel coalescence, nickel ball formation on the anode surface, and islands of disconnected nickel metal in the anode bulk. These phenomena can result in reduced conductivity and delamination of the anode from adjacent layers leading to poor performance of the fuel cell. In addition, when larger nickel particles are oxidized, the volumetric expansion associated with the oxidation may result in anode damage and eventual delamination of the anode. It is believed that the volume expansion during the oxidation of Ni to NiO may also result in microcracking in the ceramic phase, which may decrease ionic conduction in some regions of the anode and/or may reduce anode effectiveness. The following exemplary embodiments provide anode compositions and/or structures configured to reduce and/or eliminate such problems and/or other problems.

FIG. 1 illustrates an exemplary fuel cell 10, according to various embodiments of the present disclosure. Referring to FIG. 1, the fuel cell 10 may be a SOFC that contains an electrolyte 20 disposed between a cathode 30 (e.g., first electrode) and an anode 40 (e.g. second electrode). The electrolyte 20 may comprise an ionically conductive ceramic, such as doped zirconia, doped ceria, and/or any other suitable ionically conductive ceramic oxide material. For example, the electrolyte 20 may include yttria-stabilized zirconia (YSZ), scandia-stabilized zirconia (SSZ), ytterbia-ceria-scandia-stabilized zirconia (YCSSZ), or blends thereof In the YCSSZ, scandia may be present in an amount equal to 9 to 11 mol %, such as 10 mol %, ceria may present in amount greater than 0 (e.g., at least 0.5 mol %) and equal to or less than 2.5 mol %, such as 1 mol %, and ytterbia may be present in an amount greater than 0 and equal to or less than 2.5 mol %, such as 1 mol %, as disclosed in U.S. Pat. No. 8,580,456, which is incorporated herein, by reference. In other embodiments, the electrolyte may include samaria, gadolinia, or yttria-doped ceria.

The cathode 30 may include an electrically conductive material, such as an electrically conductive perovskite material, such as lanthanum strontium manganite (LSM). Other conductive perovskites, such as lanthanum strontium cobaltite ($(La,Sr)CoO_3$ "LSCo"), lanthanum strontium cobalt ferrite $(La,Sr)(Co,Fe)O_3$, etc., or metals, such as Pt, may also be used.

Furthermore, if desired, additional contact or current collector layers may be placed over the cathode 30 and anode 40, while additional interfacial layers, such as doped ceria interfacial layers, may be located between the electrodes 30, 40 and the electrolyte. For example, a Ni or nickel oxide anode contact layer and an LSM or LSCo cathode contact layer may be formed on the anode 40 and cathode 30 electrodes, respectively.

The anode 40 may comprise at least one cermet that includes a metallic phase and a ceramic phase. The metallic phase may include a metal catalyst and the ceramic phase may include one or more ceramic materials. The metallic phase may be very finely dispersed within the ceramic matrix of the ceramic phase, so as to limit damage that may occur if the metallic phase is oxidized. For example, the metallic phase may have an average grain size less than 500 nanometers, such as from about 100 to about 400 nanometers.

The ceramic phase of the anode 40 may comprise any suitable ionically conductive ceramic material, such as a doped ceria and/or a doped zirconia. For example, the ceramic phase may include, but is not limited to gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), yttria stabilized zirconia (YSZ), or the like.

The metallic phase may include a metal catalyst such as nickel (Ni), which operates as an electron conductor. The metal catalyst may be in a metallic state or may be in an oxide state. For example, the metal catalyst forms a metal oxide when it is in an oxidized state. Thus, the anode 40 may be annealed in a reducing atmosphere prior to and/or during operation of the fuel cell 10, to reduce the metal catalyst to a metallic state.

According to some embodiments, the metallic phase in its oxide state may include the metal catalyst and a dopant (i.e., alloying element). For example, the metallic phase may be represented by Formula 1: $D_xNi_{1-x}O$. In Formula 1, D is a dopant (in any oxidation state) selected from Al, Ba, Ca, Cr, Fe, Mo, Re, Rh, Ru, Sr, and/or W or any combination thereof. Preferably, the dopant has a higher melting point than nickel. X may range from about 0.01 to about 0.1. In other embodiments, x may range from about 0.01 to about 0.04. For example, x may be about 0.02 and 1-x may be about 0.98.

Accordingly, the metallic phase in its metallic state may comprise from about 1 to about 10 at % of the metal dopant and about 99 to about 90 at % of the metal catalyst (e.g., Ni). For example, the metallic phase may comprise from about 2 to about 4 at % of the metal dopant and about 98 to about 96 at % of the metal catalyst.

Without wishing to be bound by theory, it is believed that the dopants may interact with the metal catalyst in one or more of the following. The dopants may partially react and may be disposed on the surface of the catalyst material in distinct clusters. This may physically block the movement of the catalyst in the anode. The dopants may also react with the surface of the catalyst particles to form an enriched dopant concentration or shell on the surfaces of the particles. The dopants may have a lower diffusivity than Ni and may form a solid solution with Ni. This shell configuration may exhibit a higher melting temperature and slow the diffusion and coarsening process. The dopants may also react with the entire catalyst particle bulk phase. This may have a similar effect as reacting with the particle surfaces.

It is believed that when the metal dopant is added to the metal catalyst, the reduction and re-oxidation kinetics of the anode 40 are slowed down. By slowing down the reoxidation, the metallic phase may have enough time to cool down before the metal catalyst (e.g., nickel) is completely oxidized, thereby limiting and/or preventing the damage that may otherwise result from the oxidation cycle. Secondly, it is believed that the dispersion of metal oxides catalyst helps prevent agglomeration, which subsequently reduces and/or prevents damage to the ceramic phase (e.g., SDC) that may otherwise occur during metal catalyst oxidation.

The anode 40 may be an oxidation-tolerant electrode having a functionally graded configuration. For example, as shown in FIG. 1, the anode 40 may include a first layer 42 disposed on the electrolyte 20, and a second layer 44 disposed on the first layer 42. The first layer 42 may be disposed closer to the electrolyte 20 than the second layer 44. The first layer 42 may be configured to electrochemically oxidize a fuel. The second layer 44 may be configured to increase electron conduction and may operate as a reforming catalyst. The second layer 44 may have a higher porosity and/or higher Ni content, than the first layer 42.

The first and second layers 42, 44 may each include a cermet including a metallic phase and a ceramic phase, as described above. The metallic phases and/or the ceramic phases of the first and second layers 42, 44 may include the same or different materials. In some embodiments, one or both of the first and second layers 42, 44 may include only a single phase. For example, the second layer 44 may include a metallic phase and the ceramic phase may be omitted. A dopant may be added to one or both of the first and second layers 42, 44. For example, a dopant added to the second layer 44 may diffuse into the first layer 42 during a subsequent thermal treatment step.

In some embodiments, the first layer 42 may include, by weight percent, more of the ceramic phase and less of the metallic phase than the second layer 44. A weight percent ratio of the ceramic phase to the metallic phase included in the first layer 42 may range from about 99:1 to about 50:50. For example, the first layer 42 may include from about 70 to about 90 wt % of the ceramic phase, and from about 10 to about 30 wt % of the metallic phase, based on the total weight of the first layer 42. In some embodiments, the first layer 42 may include about 80 wt % of the ceramic phase and about 20 wt % of the metallic phase.

A weight percent ratio of the ceramic phase to the metallic phase in the second layer 44 may range from about 0:100 to about 50:50. For example, the second layer 44 may include from about 15 to about 35 wt % of the ceramic phase, and from about 65 to about 85 wt % of the metallic phase, based on the total weight of the second layer 44. In some embodiments, the second layer 44 may include about 20 wt % of the ceramic phase and about 75 wt % of the metallic phase. For example, the second layer 44 may include from about 90 to 100 wt % of the metallic phase. In other embodiments, when the second layer 44 includes a metallic phase comprising a metal catalyst doped with the dopant, the metallic phase may make up all or substantially all (e.g., greater than 98 wt %) of the second layer 44.

The fuel cell 10 may be manufactured by forming the cathode 30 on a first side of the electrolyte 20, and forming the anode 40 on a second side of the electrolyte 20, by depositing corresponding inks using a method such as screen printing, inkjet printing, or the like, as disclosed in U.S. Pat. No. 8,617,763, which is incorporated herein by reference. The deposited inks may be dried and/or sintered.

In particular, ceramic and metallic phases of the anode 40 may be manufactured in a single-step process (e.g., by co-synthesis or co-precipitation) for each layer 42, 44. Alternatively, the ceramic and metallic phases can be manufactured separately and then mixed in appropriate amounts for each layer 42, 44. The phases may be manufactured in the form of powders or inks, which may be mixed and deposited on a substrate, such as the electrolyte 20. Once deposited, the anode 40 and/or cathode 30 may be sintered in a reducing atmosphere. In particular, the anode 40 and cathode 30 may be sintered separately, or may be sintered together in a single step.

For co-synthesized powders, some amount of the ceramic may incidentally dope the metallic phase (e.g., if SDC is used as the ceramic phase, some amount of ceria ($CeO_2$) may be present as a dopant in the metallic phase.

In various embodiments, an anode ink may include a ceramic anode material, a catalyst, a dopant or dopant precursor, and a solvent. The ceramic anode material may be gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), any combination thereof, or the like. The catalyst may be Ni and/or NiO. The dopant precursor may be a nitrate, acetate, or chloride of Al, Ba, Ca, Cr, Fe, Mo, Re, Rh, Ru, Sr, and/or W, or a combination thereof The solvent may be an organic solvent, such as, an etidronic acid, ethanol, toluene, α-terpineol, carbitol, hexane, isopropanol, acetone, etc. The anode inks may optionally include additional components. For example, the inks may include a binder such as ethyl cellulose, polyethylene glycol, polyvinyl butyral resin; a plasticizer such as glycerin, glycol, dibutyl phthalate; and further a dispersant, a defoaming agent, and/or a surfactant.

In various embodiments, the anode ink may comprise 5-35 wt % of the solvent. The anode ink may include from about 40-80 wt % of the ceramic anode material, catalyst, and dopant precursor.

The anode ink may also include from about 1-10 wt % of the binder, from about 0-2 wt % of the dispersant, and/or from about 0-1 wt % of the plasticizer.

In some embodiments, anode inks may be prepared using one of the following methods. In a first method, the organic components of the anode ink are mixed together and a dopant precursor is added to the organic solvent used to form the anode ink. For example, the dopant precursor may be an organic or inorganic salt, such as a nitrate, acetate, or chloride of Al, Ba, Ca, Cr, Fe, Mo, Re, Rh, Ru, Sr, and/or W.

For example, the dopant precursor can be iron acetate, chromium nitrate or tungsten chloride. The composite anode material may be added to the organic solvent before or after adding the dopant precursor to form the anode ink. For example, the composite anode material may include Ni and/or NiO and a ceramic anode material. One or more layers of the anode ink may then be printed on an electrolyte, dried, and/or sintered to form an anode.

In a second method, the above dopant precursor may be added to a mixture of anode powder and a first organic solvent, such as acetone, to form an anode powder/precursor mixture. The anode powder may include a catalyst metal or metal oxide (e.g., Ni or NiO) and a ceramic anode material. The anode powder/precursor mixture may be completely dried and then ground to form a powder. The ground powder may be mixed with the organic solvent to form the anode ink. One or more layers of the anode ink may then be printed on an electrolyte, dried, and/or sintered to form an anode.

In a third method, a dopant (e.g., Al, Ba, Ca, Cr, Fe, Mo, Re, Rh, Ru, Sr, and/or W or oxides thereof) and catalyst metal or metal oxide thereof (e.g., Ni or NiO) may be alloyed to form a doped catalyst metal alloy. The doped catalyst metal alloy may be pulverized to form a powder, and the powder may be calcined to form an oxide powder. The oxide powder may be added to a mixture of an organic solvent and ceramic material to form the doped anode ink. One or more layers of the anode ink may then be printed on an electrolyte, dried, and/or sintered to form an anode.

Figure 2:
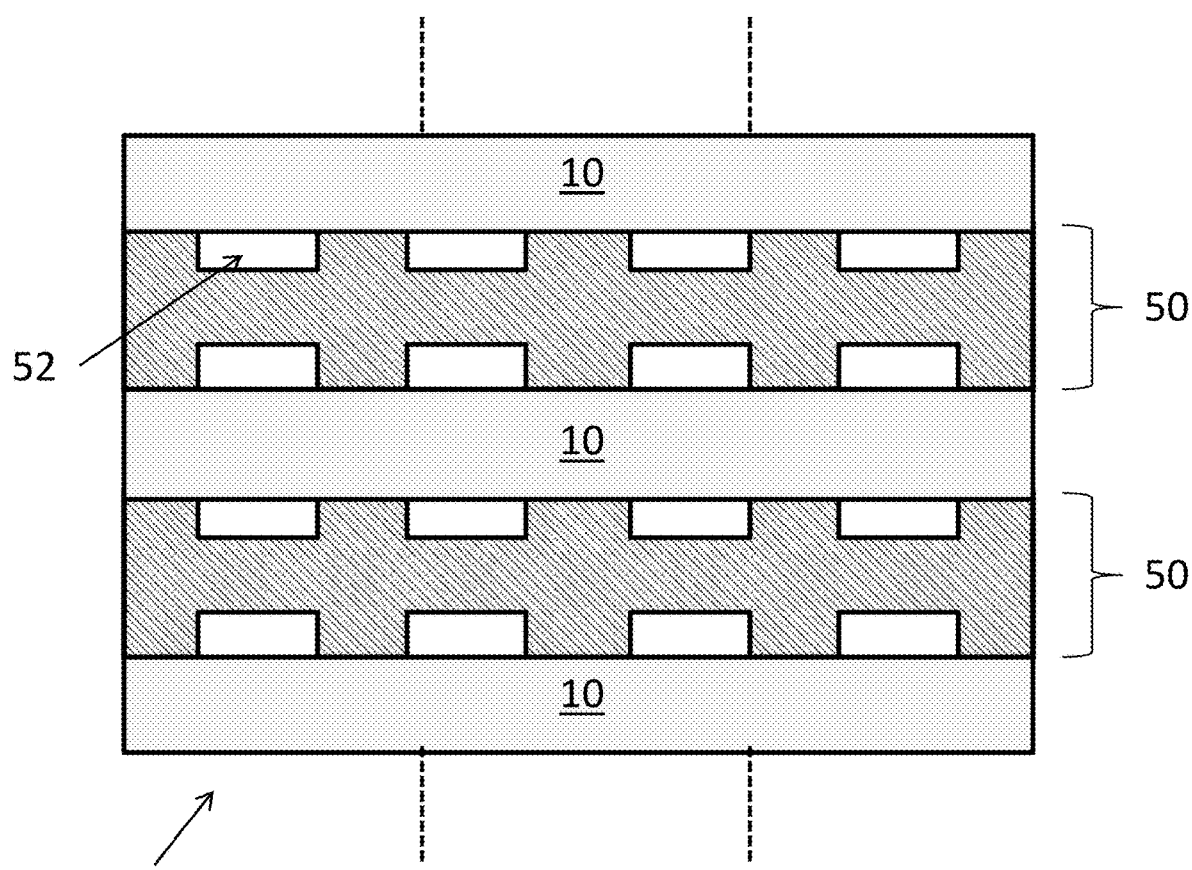
FIG. 2 is a cross-sectional view of a fuel cell stack according to various embodiments of the present disclosure.

FIG. 2 illustrates a plan view of a fuel cell stack 100 according to various embodiments of the present disclosure. Referring to FIG. 2, the stack 100 includes fuel cells 10 of FIG. 1 stacked on one another and separated by interconnects 50. The interconnects 50 include flow channels 52 configured to provide fuel or air to the fuel cells 10. The interconnects 50 may also operate to electrically connect the fuel cells 10 in series.

The term "fuel cell stack," as used herein, means a plurality of stacked fuel cells that can optionally share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

Figure 3:
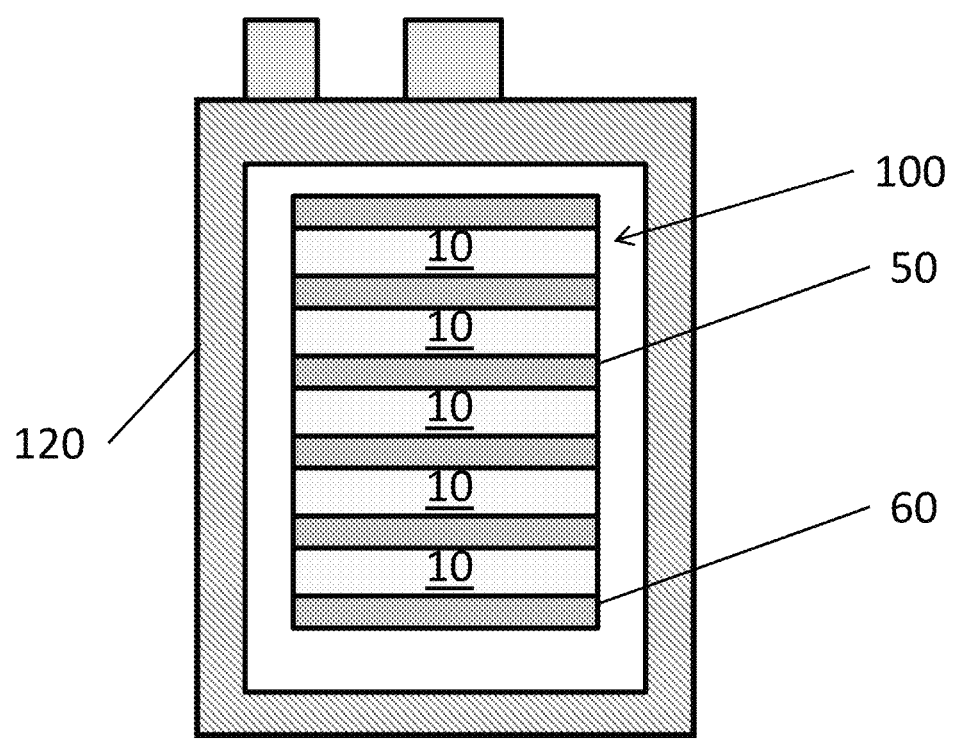
FIG. 3 is a cross-sectional view of a hotbox of a fuel cell system, according to various embodiments of the present disclosure.

FIG. 3 illustrates a plan view of a fuel cell system hotbox 120 including the stack 100 of FIG. 2, according to various embodiments of the present disclosure. Referring to FIG. 3, the hotbox 120 is shown to include the fuel cell stack 100. However, the hotbox 120 may include two or more of the stacks 100. The stack 100 may include the electrically connected fuel cells 10 stacked on one another, with the interconnects 50 disposed between the fuel cells 10, and end plates 60. The hotbox 120 may include other components, such as fuel conduits, air conduits, seals, electrical contacts, etc, and may be incorporated into a fuel cell system including balance of plant components. The interconnects 50 and/or end plates 60 may comprise any suitable gas impermeable and electrically conductive material, such as a chromium—iron alloy, such as an alloy containing 4 to 6 wt % iron and balance chromium. The interconnects 50 electrically connect adjacent fuel cells 10 and provide channels for fuel and air to reach the fuel cells 10.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A solid oxide fuel cell (SOFC), comprising:
a solid oxide electrolyte;
an anode disposed on a first side of the electrolyte and comprising:
a ceramic phase; and
a metallic phase comprising an alloy of Ni and a dopant comprising Ba, Ca, Sr, or any combination thereof; and
a cathode disposed on an opposing second side of the electrolyte,
wherein the metallic phase has an average grain size ranging from about 100 nanometers (nm) to about 400 nm.

2. The SOFC of claim 1, wherein the solid oxide electrolyte comprises ytterbia-ceria-scandia-stabilized zirconia (YCSSZ).

3. The SOFC of claim 1, wherein the ceramic phase comprises gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), or any combination thereof.

4. The SOFC of claim 1, wherein the metallic phase comprises:
from about 1 to about 10 at % of the dopant; and
from about 99 to about 90 at % of the Ni.

5. The SOFC of claim 1, wherein the anode comprises:
a first layer comprising the ceramic phase and a metallic phase comprising the Ni; and
a second layer comprising the metallic phase comprising the Ni and the dopant.

6. The SOFC of claim 5, wherein:
the metallic phase of the first layer further comprises the dopant; and
the second layer further comprises the ceramic phase.

7. The SOFC of claim 6, wherein the ceramic phases of the first and second layers are independently selected from gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), or any combination thereof.

8. The SOFC of claim 1, wherein the anode comprises:
a first layer comprising from about 70 to about 90 wt % of the ceramic phase, and from about 10 to about 30 wt % of the metallic phase, based on the total weight of the first layer; and
a second layer comprising from about 15 to about 35 wt % of the ceramic phase, and from about 65 to about 85 wt % of the metallic phase, based on the total weight of the second layer.

9. The SOFC of claim 1, wherein the dopant comprises the Ba.

10. The SOFC of claim 1, wherein the dopant comprises the Ca.

11. The SOFC of claim 1, wherein the dopant comprises the Sr.

12. The SOFC of claim 1, wherein the dopant comprises at least one of the Ba, Ca or Sr in combination with at least one of the Al, Cr, Fe, Mo, Re, Rh, Ru, or W.

13. A SOFC stack comprising:
SOFCs of claim 1; and
interconnects disposed between the SOFCs.

14. A method of forming a solid oxide fuel cell (SOFC), the method comprising:
dissolving a dopant precursor, a ceramic anode material, and a metal catalyst in a first organic solvent to form a first mixture, the dopant precursor comprising a salt comprising Al, Ba, Ca, Cr, Fe, Mo, Re, Rh, Ru, Sr, W, or any combination thereof;
drying the first mixture to form a first powder;
pulverizing the first powder to form a second powder;
mixing the second powder with a second organic solvent to form an anode ink;
coating a first side of an electrolyte with the anode ink;
drying the coated electrolyte; and
sintering the dried electrolyte to form an anode comprising:
a ceramic phase; and
a metallic phase comprising Ni and a dopant comprising Al, Ba, Ca, Cr, Fe, Mo, Re, Rh, Ru, Sr, W, or any combination thereof.

15. The method of claim 14, wherein the first organic solvent comprises acetone.

16. The method of claim 14, wherein the metallic phase comprises:
from about 2 to about 4 at % of the dopant; and
from about 98 to about 96 at % of the Ni.

17. The method of claim 14, further comprising forming a cathode on an opposing second side of the coated electrolyte.

18. The method of claim 14, further comprising disposing the SOFC in a SOFC stack.

* * * * *